(12) United States Patent
Hayes

(10) Patent No.: US 7,152,984 B1
(45) Date of Patent: Dec. 26, 2006

(54) CAT'S EYE RETRO-REFLECTOR ARRAY CODING DEVICE AND METHOD OF FABRICATION

(75) Inventor: Donald James Hayes, Parker, TX (US)

(73) Assignee: MicroFab Technologies Inc., Plano, TX (US)

( * ) Notice: Subject to any disclaimer, the term of this patent is extended or adjusted under 35 U.S.C. 154(b) by 46 days.

(21) Appl. No.: 10/915,904

(22) Filed: Aug. 11, 2004

Related U.S. Application Data

(60) Provisional application No. 60/494,749, filed on Aug. 13, 2003.

(51) Int. Cl.
*G02B 5/126* (2006.01)
(52) U.S. Cl. ............ 359/534; 359/536; 359/542; 359/900

(58) Field of Classification Search ............ None
See application file for complete search history.

(56) References Cited

U.S. PATENT DOCUMENTS 6,507,441 B1 * 1/2003 Eisenberg et al. ............ 359/627

* cited by examiner

*Primary Examiner*—James Phan
(74) *Attorney, Agent, or Firm*—Locke Liddell & Sapp, LLP

(57) ABSTRACT

The invention is a coded cat's eye retro-reflector array fabricated using data-driven, ink jet micro-dispensing technology. Specifically the invention claims the apparatus, the method of fabricating the apparatus, and the method of using the apparatus. The function of the apparatus is the identification of objects, materials and gasses from a distance using light beams. The apparatus is based upon the cat's eye retro-reflector device that is well known to one skilled in the art.

32 Claims, 3 Drawing Sheets

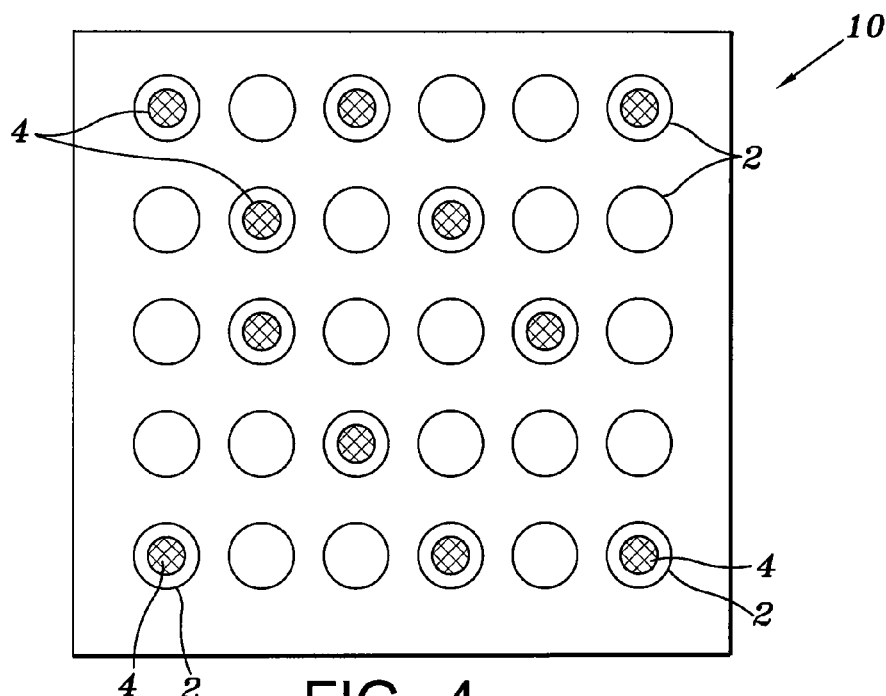
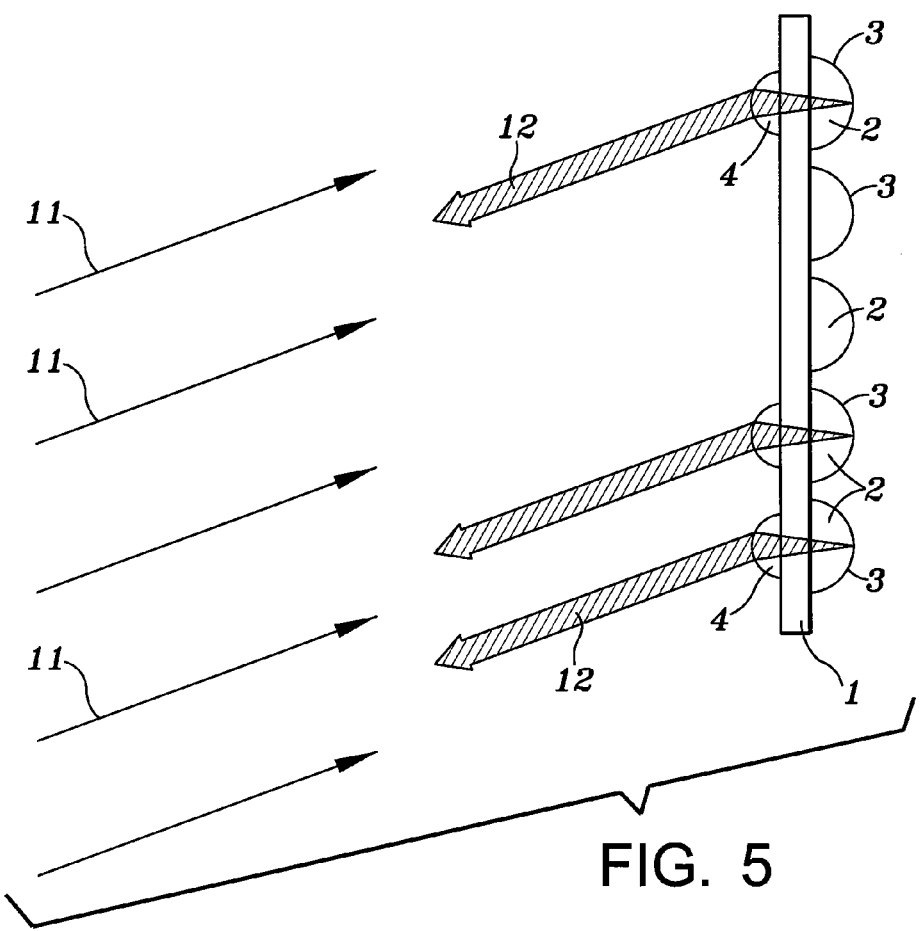

CAT'S EYE RETRO-REFLECTOR ARRAY CODING DEVICE AND METHOD OF FABRICATION

CROSS REFERENCE TO RELATED APPLICATIONS

This application claims benefit under 35 USC 119(e) for the priority date of provisional patent application No. 60/494,749 filed on Aug. 13, 2003.

FEDERALLY SPONSORED RESEARCH

Not applicable

SEQUENCE LISTING OR PROGRAM

Not applicable

BACKGROUND OF THE INVENTION—FIELD OF THE INVENTION

This invention relates to lenses, specifically cat's eye retro-reflective lenses manufactured with ink-jet printing technology to form lens arrays that provide coded information at short, long and intermediate distances.

BACKGROUNG OF THE INVENTION

The cat's eye retro-reflector lens shown in FIG. 1 is well known to one skilled in the art. It displays the features that a light beam incident onto the lens as illustrated in FIG. 1 is reflected back in the same direction as the incident beam as long as the angle $\theta$ is less than approximately 50 degrees. It got its name from the observation that shining a light onto a cat the light reflects back toward you from the cat's eyes. References are included that goes into more detail about the cat's eye retro-reflector lens.

In this invention the cat's eye retro-reflector array is fabricated using data-driven, ink jet micro-dispensing technology. Using ink jet technology to fabricate microlenses and larger lenses have be described in detail in U.S. Pat. Nos. 5,498,444 and 5,707,684, we want to incorporate by reference these patents into this application.

BACKGROUND OF THE INVENTION—OBJECTS AND ADVANTAGES

The objects and advantages of the present patent are:
a) to provide a cat's eye retro-reflector lens array that provides coded data about an object that does not require target proximity to access the information;
b) to provide a cat's eye retro-reflector lens array that provides unique coded data about an object because of the number of points within an array is unlimited;
c) to provide a cat's eye retro-reflector lens array that is manufactured using dispensing of lens materials;
d) to provide a cat's eye retro-reflector lens array that conveys unique coded data to an interrogator through conventional means of altering adsorption, emission, spectra, frequency, or wavelength characteristics of an electromagnetic wave.

Further objects and advantages are to provide a cat's eye retro-reflector lens array capable of providing identification information by analyzing materials presented to specific points on the array. Ink-jet printing can populate an array with numerous lens interrogation points as needed by the end user.

SUMMARY

The invention relates to apparatus, the methods for providing and coding the apparatus, and the method of optically reading the apparatus over a wide range of distances. It can be read as a security badge less than one inch from the reading device or it could be read using a powerful telescope from a satellite. The coded information can be used to identify an object (people and things). For this case a pattern of optical signals would identify the object. This could be the pattern of signals themselves or specific information coded in each of the signals. Information encoded into each signal could be wavelength dependent or absorption dependent. The absorption dependence or wavelength dependence nature of the array makes it useful as a gas or biological sensor.

The invention consists of two arrays of lenses aligned on opposite sides of a substrate. Each pair is a cat's eye retro-reflector lens. The lens on the back side is metallized to reflect the light. An incoming beam of light impinging on the front side lens is focused onto the back side lens and the signal is returned into the same direction from which it came. For this type of lens system this is true if the incoming beam is within approximately 50 degrees from normal. In this invention the cat's eye retro-reflector array is fabricated using data-driven, ink jet micro-dispensing technology. Because of the data driven nature of the technology, the array pattern on the front side of the array can be pattern, a different pattern for every array. The back side would have 100% of the lenses present. When light impinges onto the array only locations where the front side lenses are present would reflect light back to the sending instrument. The instrumentation would detect the pattern that was originally printed onto the array.

DRAWINGS—FIGURES

FIG. 4 illustrates a top view of a coded array, where the front lenses R1 were only printed onto specific programmed array locations.

FIG. 5 shows the operation of a coded array where the returning beam is only present where the R1 lenses were present.

DETAILED DESCRIPTION—FIGS. 1, 2, 4—PREFERRED EMBODIMENT

Figure 1:
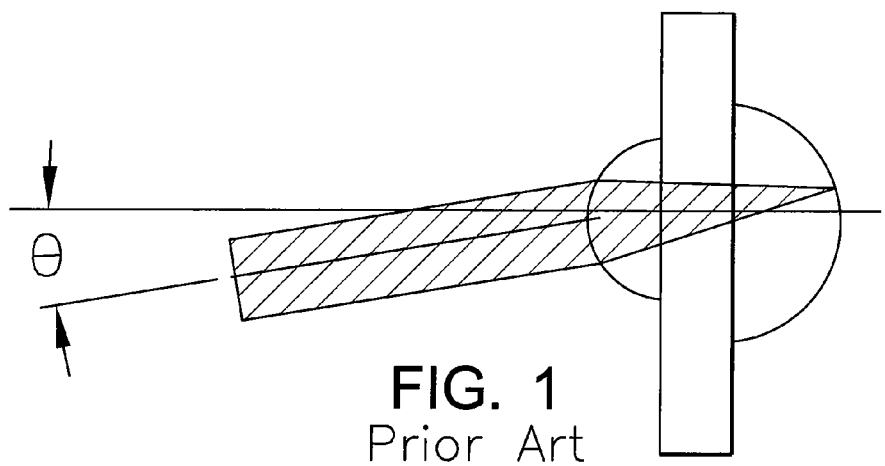
FIG. 1 shows a functional diagram of a cat's eye retro-reflector lens.
Figure 2:
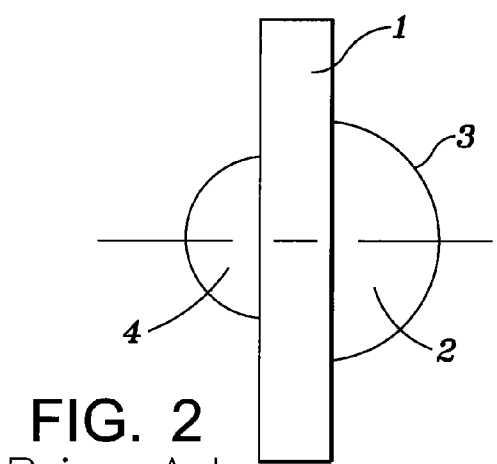
FIG. 2 shows the components of the cat's eye retro-reflector lens printed on both sides of a substrate.

In a typical embodiment of the device according to the invention is shown in FIGS. 1, 2, 3, 4, and 5. There is at least one cat's eye retro-reflector lens that consists of a substrate (1) made out of an optically transparent material that has an index of refraction close to that of the microlenses printed on both sides of the substrate. A larger microlens R2 (2) is on the back side of the substrate. This lens is metallized (3) so that it reflects light impinging on it from the front side. This metallization (3) could be deposited by various means including evaporation, sputtering, organometallic conversion, etc. One skilled in the art could easily apply various meads to metallize this surface. The other lens with lens radius R1 (4) is shown on the front side as seen in FIG. 2.

FIGS. 3A–C,—METHOD OF MANUFACTURE

Figure 3A:
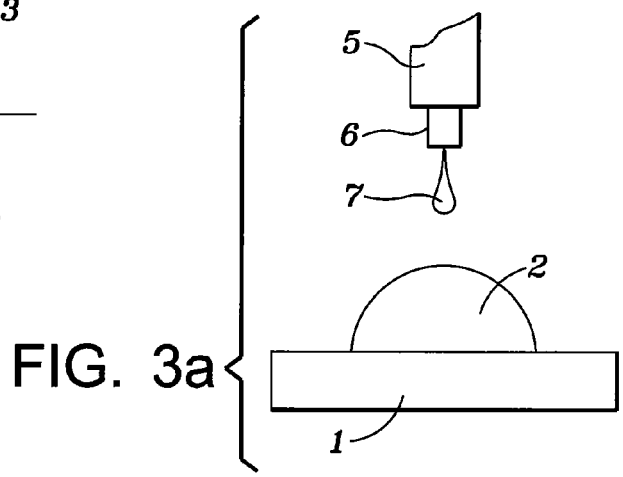
FIG. 3 shows the fabrication method of the cat's eye retro-reflector lens using ink jet micro-dispensing technology.
Figure 3B:
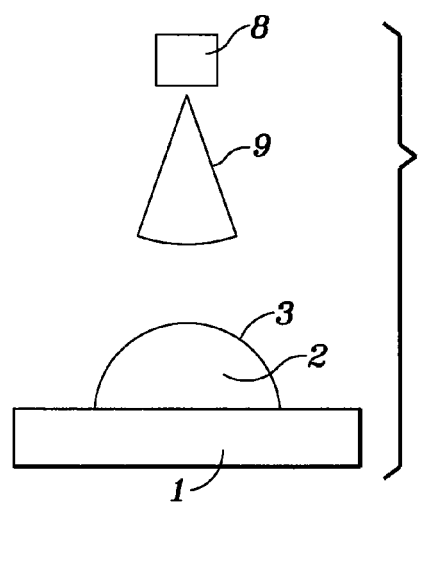
Figure 3C:
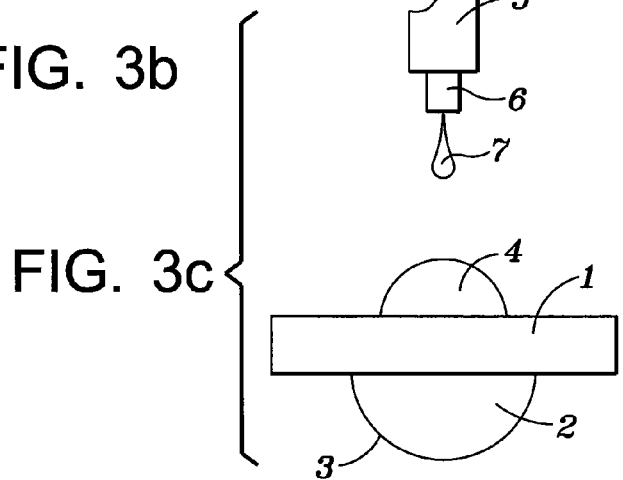

The method of fabricating the cat's eye retro-reflector lens is shown in FIG. 3. In the first step (FIG. 3a) a Micro-jetting Device (5) is positioned over the appropriate location on the substrate. Droplet(s) (7) of lens material is dispensed through an orifice (6) onto the substrate (1) to form the microlens (2). This process is documented in U.S. Pat. No. 5,498,444 and U.S. Pat. No. 5,707,684 that are incorporated by reference into this application. After dispensing the correct number of droplets (7) the lens would be converted to a solid lens structure by one of many conversion processes. In this embodiment a UV curing process followed by a thermal cure is used. The second step in the process is metallizing the back surface of the back side lens (2). One method is shown in the FIG. 3b, where a metallization source (8) is shown schematically. This source would project a metal vapor stream (9) toward the lens. This process will deposit a reflective metal film (3) onto the lens surface. In FIG. 3c the same process is repeated with a small volume of fluid dispensed to create the front side microlens (4).

FIG. 4 shows a top view of a larger substrate (10) with an array of microlenses printed on both sides. This figure shows back side microlenses (2) printed at every location and front side microlenses (4) printed into a predetermined pattern. This is done by stepping the micro-jetting device only over certain predetermined locations to form front side microlenses. This stepping process is documented in the patents incorporated into this application. The pattern of front side microlenses printed can be a specific code for identification.

FIG. 5—METHOD OF OPERATION

FIG. 5 illustrates how this type of a coded cat's eye retro-reflector array works. A targeting light source (11) is made to shine onto the array. The arrows pointing from left to right in this figure illustrates this. If the light beam is aligned to the array within the allowed angle then the full cat's eye retro-reflector lenses will send the signal back to the targeting area. The arrows pointing away from the array, right to left show this. The returning light code (12) depends upon the location of the front side microlenses. The data driven nature of the precision microdispensing technology enables individual codes to be printed from a set of data patterns.

FIGS. 6,7—ADDITIONAL EMBODIMENTS

Figure 6:
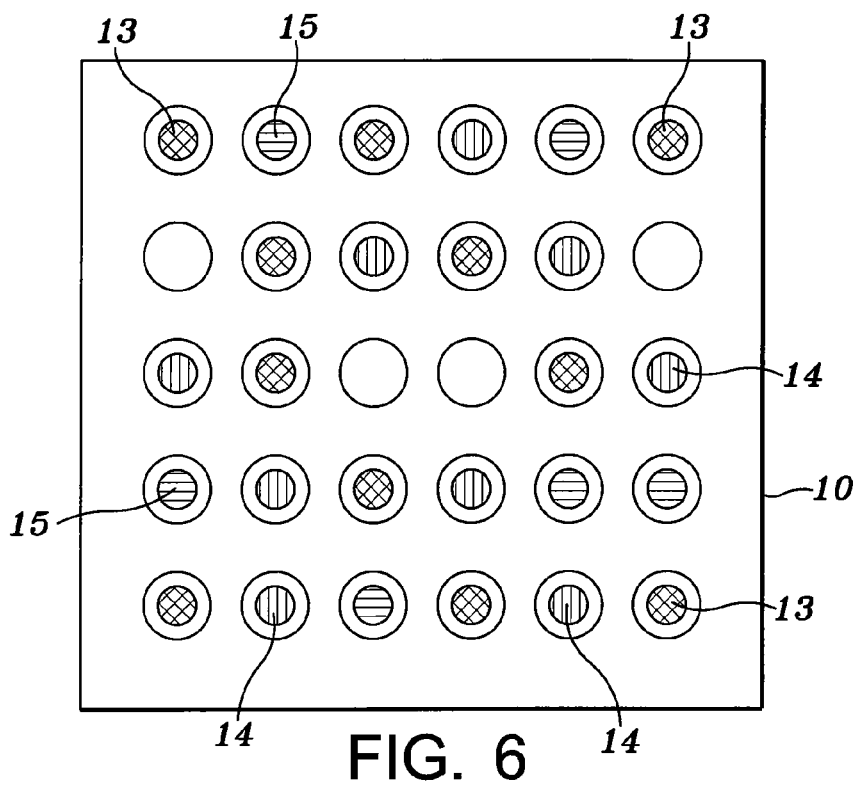
FIG. 6 shows more complex method of coding where the top lenses consist of different materials, each optical material is coded onto the array.

FIG. 6 illustrates a variation of this method of coding. FIG. 6 shows front side microlenses printed with different materials. These materials may have absorptive dyes in the lens material, so that the color of each would be different. Material A (13) could be the one used in FIG. 5; Material B (14) may have a dye present that changes the light absorbed and gives a color to the returning light, Material C (15) would have a different dye and therefore a different color. By using more that one material a more complex coding could be developed.

Figure 7:
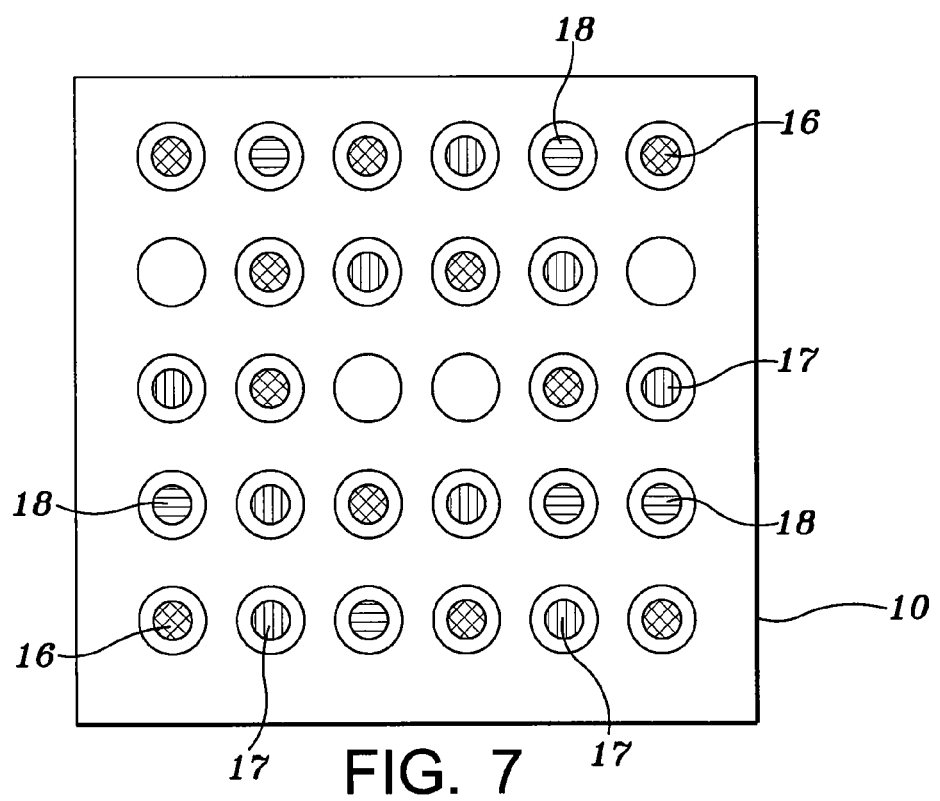
FIG. 7 illustrates that the different optical materials could be sensitive to different species, like a gas; changes in specific material properties would indicate the presence of the specific species.

FIG. 7 illustrates a variation of this method of coding that can be use to make remote sensors. In this case, the different materials would be sensor materials sensitive to different gas molecules. In this application the front side microlenses would be printed with polymers sensitive to different gas modules. These lenses would change properties in a detectable way if the gas if a particular gas is present Microlens (16) would be sensitive to Gas A; Microlens (17) would be sensitive to Gas B and microlenses (18) would be sensitive to Gas C. The remote sensing system would be looking for changes to the optical signals that would indicate that a particular gas was present. Changes in the optical signal could arise from changes in absorption of the lens materials, swelling of the polymer lens that would change the focal length of the lens, or other optical changes.

The same type sensor system shown in FIG. 7 could indicate the presence of specific bio-molecules if the appropriate indicator chemistry was present in the microlenses.

As will be apparent to those skilled in the art from the description herein contained, the apparatus and method of fabrication may be embodied in other patterns, forms or arrangements and use other materials without departing form the scope of the invention.

Advantages

From the description above a number of advantages of this cat's eye retro-reflector lens array manufactured through ink-jet dispensing:

(a) numerous lens pairs may be easily and quickly created with a data driven process.
(b) a myriad of lens materials or sensor materials may be printed as lenses within a given array
(c) ink-jet printing of the lenses enables creating lenses of diameters and geometries to suit a range of interrogation distances
(d) ink-jet printing allows tailoring of the optical characteristics of each lens pair unavailable with standard lens array methods.

I claim:

1. A coded cat's eye retro-reflector array consisting of:
    an array of metallized lenses on the back side of an optical substrate,
    an array of at least one lens printed on the front side of the optical substrate aligned with at least one of the metallized lenses on the back side of the optical substrate to form a cat's eye retro-reflector,
    wherein the printed lenses on the front side of the optical substrate formed a pattern of a specific code from a set of data patterns.

2. The device as set forth in claim 1 wherein the lenses printed on the front side of the optical substrate are printed with a data driven micro-dispensing device.

3. The device as set forth in claim 2 wherein the microdispensing device is an ink jet printing device.

4. The device as set forth in claim 3 wherein the ink jet printing device is drop-on-demand ink jet printing device.

5. The device set forth in claim 1 wherein the lenses printed on both sides of the optical substrate are printed with a micro-dispensing device.

6. The device as set forth in claim 5 wherein the microdispensing device is an ink jet printing device.

7. The device as set forth in claim 6 wherein the ink jet printing device is drop-on-demand ink jet printing device.

8. A coded cat's eye retro-reflector array consisting of:
    an array of metallized lenses on the back side of an optical substrate,
    an array of at least one lens printed with a first selected optical material having a first set of optical properties on the front side of the optical substrate aligned with at least one of the metallized lenses on the back side of the optical substrate to form a cat's eye retro-reflector, an array of at least one lens printed with a second selected optical material having a second set of optical properties on the front side of the optical substrate aligned with at least one of the metallized lenses to form a cat's eye retro-reflector, material wherein the printed lenses formed a pattern of a specific code from a set of data patterns, and the lenses are formed of different materials on the front side of the optical substrate.

9. The device as set forth in claim 8 wherein the lenses printed on the front side of the optical substrate are printed with a data driven micro-dispensing device.

10. The device as set forth in claim 9 wherein the micro-dispensing device is an ink jet printing device.

11. The device as set forth in claim 10 wherein the ink jet printing device is drop-on-demand ink jet printing device.

12. The device set forth in claim 8 wherein the lenses printed on both sides of the optical substrate are printed with a micro-dispensing device.

13. The device as set forth in claim 12 wherein the micro-dispensing device is an ink jet printing device.

14. The device as set forth in claim 13 wherein the ink jet printing device is drop-on-demand ink jet printing device.

15. A coded cat's eye retro-reflector array consisting of:
an array of metallized lenses on the back side of an optical substrate,
an array of at least one lens printed with a selected optical sensor material on the front side of the optical substrate aligned with at least one of the metallized lenses on the back side of the optical substrate to form a cat's eye retro-reflector,
wherein the printed lenses formed a pattern of a specific code from a set of data patterns on the front side of the optical substrate.

16. The device as set forth in claim 15 wherein the select optical sensor material changes properties in the presence of a particular chemical gas.

17. The device as set forth in claim 15 wherein the select sensor material changes properties in the presence of a select biomolecule.

18. The device as set forth in claim 15 wherein the select sensor material changes properties in the presence of radiation.

19. The device as set forth in claim 15 wherein multiple optical sensor materials are used to print multiple lenses, with each lens sensitive to a particular gas, biomolecule or radiation.

20. A method for producing a cat's eye retro-reflector, comprising the steps of:
direct printing of optical forming material to form a pre-designed micro-optical lens onto an optical substrate,
metallizing the outside surface of the micro-optical lens with a reflective metal
direct printing of optical forming material to form another micro-optical lens onto the other side of the substrate aligned with the pre-designed micro-optical lens, the another micro-optical lens pre-designed to form a cat's eye retro-reflector wherein the another micro-optical lenses formed a pattern of a specific code from a set of data patterns on the other side of the substrate.

21. The method according to claim 20 wherein the printing of the optical forming materials is printed with a drop-on-demand system.

22. The method according to claim 21 wherein said drop-on-demand system is driven by a transducer selected from the group consisting of a piezoelectric transducer, an electrostrictive transducer, a magnetostrictive transducer and an electromechanical transducer.

23. The method according to claim 20 wherein portions of said optical substrate are masked with a coating which is non-wetting with respect to said optical forming material and said optical forming material is ejected from an ejection device to unmasked portions of said substrate.

24. The method according to claim 23 wherein the size and shape of the micro-optical lens is varied by controlling the number and volume of drops of optical forming material ejected from said ejection device to said unmasked portions of said substrate.

25. A method of interrogating a coded cat's eye retro-reflector array consisting of:
directing a targeting light source onto the coded cat's eye retro-reflector array,
sensing the returning light code from the cat's eye retro-reflector array and determining which locations on the array are sending the light back,
identifying the locations where the front side lenses are present and comparing the locations to the coded data to identify the cat's eye retro-reflector array.

26. The method according to claim 25 wherein the targeting light source is produced by a laser.

27. The method according to claim 25 wherein the targeting light source is within 50 degrees from normal to the cat's eye retro-reflector surface.

28. The method according to claim 25 wherein the returning light code is detected by an image detector device selected from the group consisting of a CCD, Photodiode array, and a photo-multiplier tube.

29. A method of interrogating a coded cat's eye retro-reflector array consisting of:
directing a targeting light source onto the coded cat's eye retro-reflector sensor array with a light appropriate for the particular sensors,
sensing the returning light code and properties from the cat's eye retro-reflector array sensor and determining which locations on the array are sending the light back,
identifying the locations where changes in the sensors have occurred and comparing these locations to the coded data to identify the cat's eye retro-reflector sensor array, where the sensor is a specific gas, a specific molecule or radiation.

30. The method according to claim 29 wherein the targeting light source is produced by a laser.

31. The method according to claim 29 wherein the targeting light source is within 50 degrees from normal to the cat's eye retro-reflector sensor array surface.

32. The method according to claim 29 wherein the returning light code is detected by an image detector device selected from the group consisting of a CCD, Photodiode array, and a photo-multiplier tube.

* * * * *